Jan. 14, 1947.  C. B. SMITH ET AL  2,414,176
SLUDGE SETTLING AND DEWATERING TANK COMPRISING A TANK PROVIDED WITH
A VERTICAL PARTITION DIVIDING IT INTO COMPARTMENTS, A FLOW DIS-
TRIBUTOR AND A WEIR FOR EACH COMPARTMENT, AND A CONVEYER FOR
EACH COMPARTMENT FOR REMOVING SETTLED SOLIDS
Filed April 1, 1944  2 Sheets-Sheet 1

INVENTOR.
Carlos B. Smith &
Harry Leslie Bullock
BY Harry Radzinsky
ATTORNEY

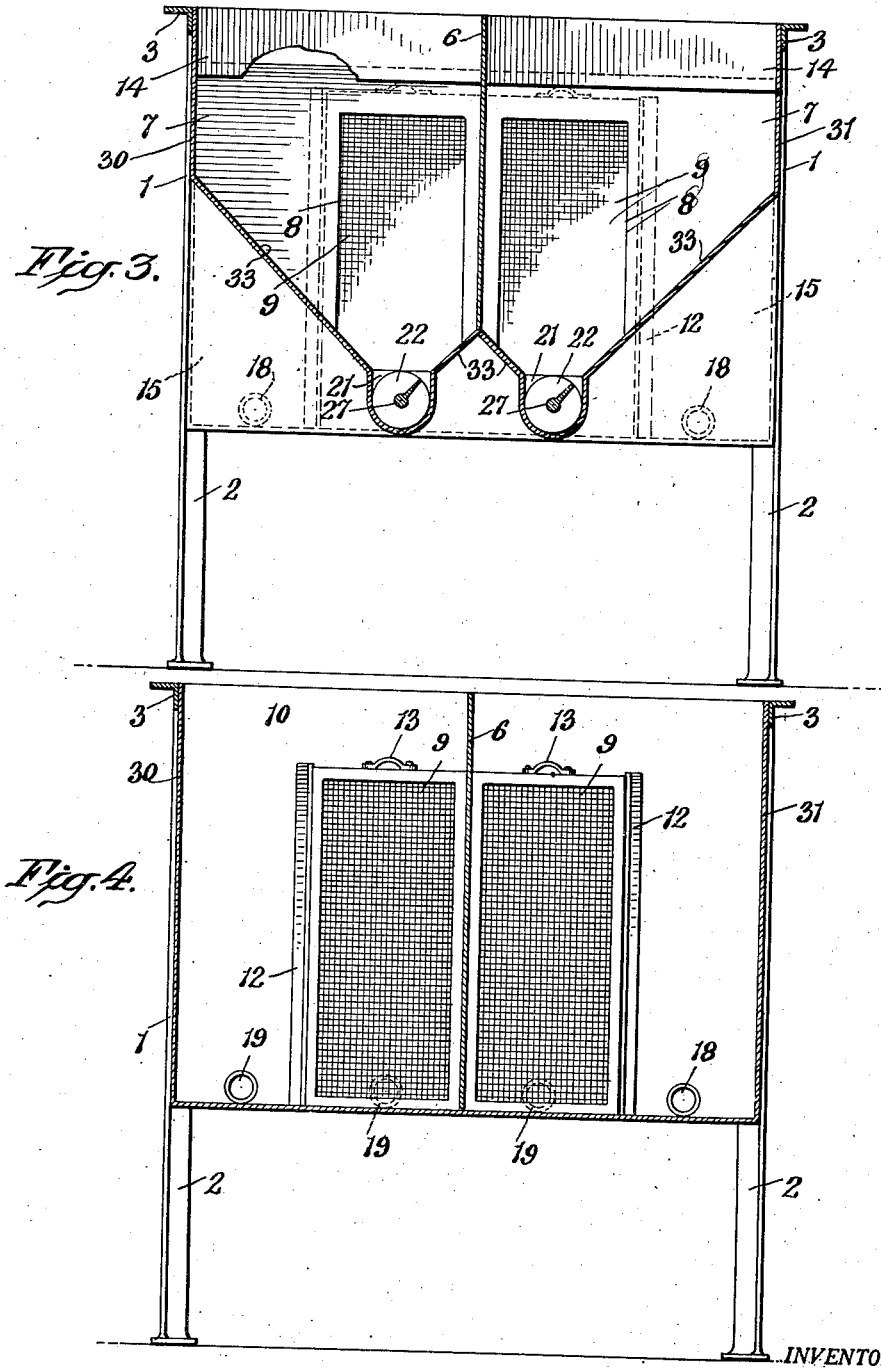

Patented Jan. 14, 1947

2,414,176

UNITED STATES PATENT OFFICE 2,414,176

SLUDGE SETTLING AND DEWATERING TANK COMPRISING A TANK PROVIDED WITH A VERTICAL PARTITION DIVIDING IT INTO COMPARTMENTS, A FLOW DISTRIBUTOR AND A WEIR FOR EACH COMPARTMENT, AND A CONVEYER FOR EACH COMPARTMENT FOR REMOVING SETTLED SOLIDS

Carlos B. Smith and Harry Leslie Bullock, New York, N. Y.

Application April 1, 1944, Serial No. 529,198

2 Claims. (Cl. 210—43)

This invention relates to sludge settling and dewatering tanks in which a flow of liquid, carrying solid matter, is caused to flow sluggishly to permit the solid material to settle in the bottom of the tank while the liquid flows slowly across the tank to reach a circulating outlet.

An object of the invention is to provide a tank of this character in which at least two compartments are provided, one of which can be used for the continuous removal of the solid material from the circulating fluid while the other compartment is being used for the separation of the conveying fluid from the solid material entrapped within the latter compartment, and for the removal of the sludge.

Another object of the invention is to provide, in a double-compartment tank of the character described, separate sludge-removing means by which the sludge collected in one compartment can be removed without halting the separating operation which is going on in the second compartment.

The invention contemplates other features and improvements to be hereinafter set forth and more particularly pointed out in the claims appended hereto.

In the accompanying drawings forming a part hereof,

Fig. 3 is a sectional view on the line 3—3 of Fig. 1, looking in the direction of the arrows; and Fig. 4 is a sectional view on the line 4—4 of Fig. 1, looking in the direction of the arrows.

Figures 1, 2:
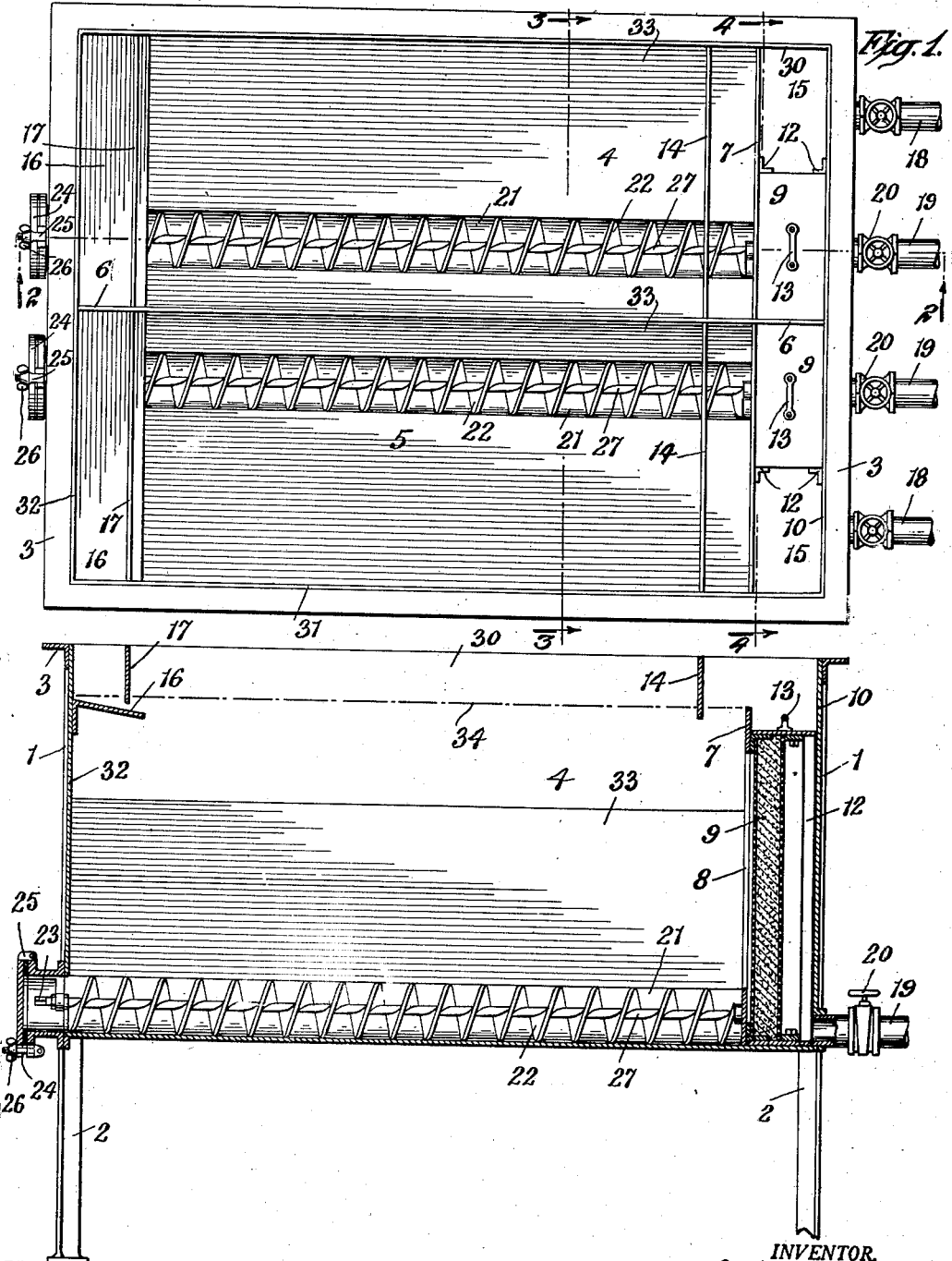
Fig. 1 is a plan view of a tank constructed in accordance with the invention.
Fig. 2 is a sectional view on the line 2—2 of Fig. 1, looking in the direction of the arrows.

The tank includes side walls 30 and 31, and the end walls 10 and 32, and is supported in a suitable framework including the vertical members 1 extended downwardly to form supporting legs 2, and the reinforcing edge-piece or top member 3. The tank is provided with two compartments, indicated, respectively, at 4 and 5, separated by the longitudinal partition 6, and each compartment having the downwardly inclined bottoms 33 leading to a trough 21. Near one end of the tank is provided a weir plate 7 extending across the tank, said plate being provided in each of the compartments 4 and 5 with an opening 8 through which access to a filter 9 is had by the liquid contents of the tank.

The two filters are located between the weir plate 7 and the end wall 10 of the tank in a chamber 15, each filter being located between the central partition 6 and suitable guides 12. At its top, each filter has a handle 13 by which it may be removed and replaced.

Located near the weir plate 7 and extending downwardly from the top of the tank for a short distance to a point below the normal water level 34, is a weir plate 14, the purpose of which is to prevent floating solid material from passing over the top of the weir plate 7 and reaching the compartment 15 in which the filters 9 are contained.

At the end of the tank remote from the filters is the intake of the tank at which distributing means for each compartment, consisting of an inclined spill plate 16 and the vertical baffle 17, are located. As will be noted in Fig. 1, each of the compartments 4 and 5 has its own distributor, so that the inflow can be diverted to feed one or the other of the compartments through either one of the distributors, according to which one of the compartments is to be kept in operation while the other compartment is being drained of liquid and cleaned of its collected sludge.

In ordinary operation, the liquid is caused to flow into one or the other of the distributors 16, 17 to fill one compartment of the tank and to flow sluggishly over the top of the weir plate 7 and into the compartment 15 and out through the circulating pipe 18. During this sluggish flow, heavy solids sink to the bottom of the compartment in which the liquid is contained, and accumulate in the lower part of that compartment. The liquid flowing over the top of the weir plate 7 and out through the circulating pipe 18 is thus in more or less clear state.

When one compartment of the tank has collected its proper quantity of sludge and requires a clean-out, the valve in the pipe 18 for that compartment is closed and the flow of incoming liquid is then diverted to the distributor 16, 17 which supplies the second compartment of the tank. Each compartment 4 and 5 is provided with its own drain 19 communicating with a filter 9 and controlled by the valve 20, and when the flow to a compartment is discontinued and the sludge is to be removed therefrom, the valve 20 for the drain 19 for that compartment is opened, causing any liquid remaining in the collected sludge to drain out through its filter 9 to be fed to the pump intake line and recirculated through the system. While this is taking place, the second compartment of the tank is in operation. The recirculation of the drainage water serves to keep any solid material which might pass through the filters out of the sewage system.

At the bottom of each compartment 4 and 5 of the tank is provided a depression or trough 21 extending lengthwise of the tank, and in each of the troughs is provided a screw conveyer 22 for use in removing the sludge. Thus, when the flow of water through drain outlet has ceased, the screw conveyer 22 is rotated to discharge the accumulated sludge. This can be done by means of a hand crank engaging the square end 23 at the end of the conveyer shaft 27. A door 24, hinged at 25, and provided with suitable closure means 26, permits access to the conveyer shaft 27 and also allows discharge of the sludge which drops into a conveniently placed receptacle. When the sludge has thus been removed from one compartment, the door 24 therefor is closed, the valve 20 for that compartment is closed, and the compartment is then again ready for service.

With the arrangement disclosed, continuous operation of the tank is assured since one compartment is maintained in use while the other is being drained and cleaned of accumulated sludge. Various other advantages of the disclosed construction will be apparent to those skilled in this art.

While we have herein described the improved tank as being provided with twin or dual compartments, it will be apparent that in instances where uninterrupted service is not an absolute essential, a single compartment structure may be employed. This invention is therefore to be taken as comprehending a single compartment structure as well as one in which a plurality of compartments is used.

What we claim is:

1. In an apparatus of the character described, a tank provided with a substantially central vertical partition dividing it into two separate side-by-side independently operative compartments, a flow distributor for each compartment, each distributor consisting of an inclined splash plate and a vertical baffle close to the same, each of the compartments having an end wall provided with an outlet opening and a drain opening, a vertically disposed weir plate near the last-mentioned end wall, each compartment having its own filter interposed between the weir plate and the end wall and in communication with the drain openings, the opposite end of the tank being provided with a sludge-removal opening for each compartment, each compartment having a channel in its bottom extending longitudinally of the compartment, a screw conveyer operative in each channel for removing sludge out of the sludge-removal opening for the compartment, each compartment and its conveyer being operative independently of the other.

2. In an apparatus of the character described, a tank divided by a central, vertical partition to form it into two compartments, a transversely extending weir plate adjacent to one end of the tank and dividing the tank into two chambers located respectively between the compartments and the end wall of the tank, each compartment being thus provided with its own end chamber between the weir plate and the end of the tank, an outlet pipe leading from each of said chambers whereby fluid overflowing the weir plate will enter a chamber and flow out of the outlet pipe leading therefrom, a filter contained in each chamber, a drain outlet for each filter through which filtered fluid may emerge, sludge-removal means for each compartment including a sludge-removal opening at an end of the tank remote from the drain outlets, the sludge-removal means in one compartment being operative independently of that in the other compartment and one compartment being operative and receiving an inflow while the sludge-removal means in the other compartment is in operation.

CARLOS B. SMITH.
H. LESLIE BULLOCK.